United States Patent
Koh et al.

(10) Patent No.: US 10,200,645 B2
(45) Date of Patent: Feb. 5, 2019

(54) IMAGE SENSOR FOR PERFORMING COUPLING-FREE READOUT, AND DEVICE HAVING THE SAME

(71) Applicant: Samsung Electronics Co., Ltd., Suwon-si, Gyeonggi-do (KR)

(72) Inventors: Kyoung Min Koh, Hwaseong-si (KR); Ju Ha Kim, Yongin-si (KR); Jae Cheol Yun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 3 days.

(21) Appl. No.: 14/965,891

(22) Filed: Dec. 10, 2015

(65) Prior Publication Data
US 2016/0173800 A1 Jun. 16, 2016

(30) Foreign Application Priority Data
Dec. 11, 2014 (KR) .................. 10-2014-0178101

(51) Int. Cl.
*H04N 5/378* (2011.01)
*H04N 9/04* (2006.01)

(52) U.S. Cl.
CPC ............. *H04N 5/378* (2013.01); *H04N 9/045* (2013.01)

(58) Field of Classification Search
CPC .................. H04N 5/378; H04N 9/045
See application file for complete search history.

(56) References Cited

U.S. PATENT DOCUMENTS

| | | | |
|---|---|---|---|
| 4,179,711 A | 12/1979 | Nagumo | |
| 7,408,443 B2 | 8/2008 | Nam | |
| 7,880,786 B2 | 2/2011 | Muramatsu | |
| 8,049,799 B2 | 11/2011 | Sonoda et al. | |
| 8,502,895 B2* | 8/2013 | Yosefin | H04N 5/3535 348/266 |
| 8,508,641 B2 | 8/2013 | Uchida | |
| 8,792,029 B2 | 7/2014 | Lee | |
| 8,817,150 B2 | 8/2014 | Giffard et al. | |
| 2011/0273626 A1 | 11/2011 | Ogino et al. | |
| 2012/0038802 A1 | 2/2012 | Arii | |
| 2013/0181116 A1 | 7/2013 | Matsuda et al. | |
| 2014/0285697 A1* | 9/2014 | Nitta | H03M 1/1023 348/308 |

FOREIGN PATENT DOCUMENTS

JP 2005175545 A 6/2005

* cited by examiner

*Primary Examiner* — Twyler L Haskins
*Assistant Examiner* — Angel L Garces-Rivera
(74) *Attorney, Agent, or Firm* — Renaissance IP Law Group LLP

(57) ABSTRACT

An image sensor is disclosed. The image sensor includes a plurality of pixels, a switch circuit coupled to the pixels and configured to substantially simultaneously output signals output only from pixels having similar characteristics among the pixels in response to a control signal; and a comparison circuit configured to convert the signals output from the switch circuit into digital signals. The pixels having similar characteristics are located across among the plurality of pixels.

20 Claims, 7 Drawing Sheets

FIG. 5

| | | | | | |
|---|---|---|---|---|---|
|(8)| Gb | Gb | Gb | Gb ||
|(7)| B | B | B | B ||
|(6)| R | R | R | R ||
|(5)| Gr | Gr | Gr | Gr ||
|(4)| gb | gb | gb | gb ||
|(3)| b | b | b | b ||
|(2)| r | r | r | r ||
|(1)| gr | gr | gr | gr ||

Time →

IMAGE SENSOR FOR PERFORMING COUPLING-FREE READOUT, AND DEVICE HAVING THE SAME

CROSS-REFERENCE TO RELATED APPLICATION

This application claims priority under 35 U.S.C. § 119 from Korean Patent Application No. 10-2014-0178101 filed on Dec. 11, 2014, the disclosure of which is hereby incorporated by reference in its entirety.

BACKGROUND

Embodiments relate to an image sensor, and particularly to an image sensor for performing a coupling-free readout, which can suppress a coupling effect caused by parasitic capacitance that is present between adjacent analog-digital converters, and a device having the same.

A complementary metal-oxide semiconductor (CMOS) image sensor is a solid state image photographing device which is manufactured using a CMOS process. The CMOS image sensor has an advantage of being manufactured at a lower cost, and consuming less power due to a smaller pixel size than a CCD image sensor including a high voltage analog circuit. In addition, as performance of the CMOS image sensor is improved, the CMOS image sensor has been widely used in home appliances in addition to a portable device such as a smart phone or a digital camera.

A pixel array included in the CMOS image sensor includes a photoelectric conversion element in each pixel. The photoelectric conversion element may generate an electrical signal varying according to an amount of incident light, and the CMOS image sensor may generate an image by processing the electrical signal. As an analog-digital converting method of the CMOS image sensor, a single-slope analog digital converting method is widely used. In the single-slope analog digital converting method, a ramp signal simply varying with time in a given direction is compared with a pixel signal having a given voltage level, and time (or time point) when a voltage level of the ramp signal equals to a voltage level of the pixel signal is converted into a digital signal according to a result of the comparison.

A CMOS image sensor includes analog-to-digital converters which can convert analog pixel signals output from pixels into digital signals. A coupling effect is generated between adjacent analog-to-digital converters by parasitic capacitance that is present between the adjacent analog-to-digital converters. In particular, the coupling effect which is increased as a difference between pixels signals becomes large increases non-linearity of each of analog-to-digital converters. The non-linearity is one of sources of errors of an analog-to-digital converter.

SUMMARY

An embodiment includes an image sensor comprising: a plurality of pixels; a switch circuit coupled to the pixels and configured to substantially simultaneously output signals output only from pixels having similar characteristics among the pixels in response to a control signal; and a comparison circuit configured to convert the signals output from the switch circuit into digital signals. The pixels having similar characteristics are located across among the plurality of pixels.

An embodiment includes a mobile computing device comprising: an image sensor; and an application processor configured to control an operation of the image sensor, wherein the image sensor includes: color pixels; a switch circuit configured to substantially simultaneously output color signals output only from color pixels having similar characteristics among the color pixels in response to a control signal; and a comparison circuit configured to compare each of the color signals and a reference signal, and outputs each of comparison signals corresponding to a result of the comparison. The pixels having similar characteristics are located across among the plurality of pixels.

An embodiment includes an image sensor comprising: a plurality of pixels including pixels of a plurality of types, wherein at least one type is different from the other types; and a switch circuit coupled to the pixels and configured to, in response to a control signal, alternate among the types of pixels for signals to be substantially simultaneously output from the switch circuit.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 conceptually shows a readout operation for color pixels having the same or similar characteristics among color pixels shown in FIG. 4;

DETAILED DESCRIPTION OF EMBODIMENTS

Figure 1:
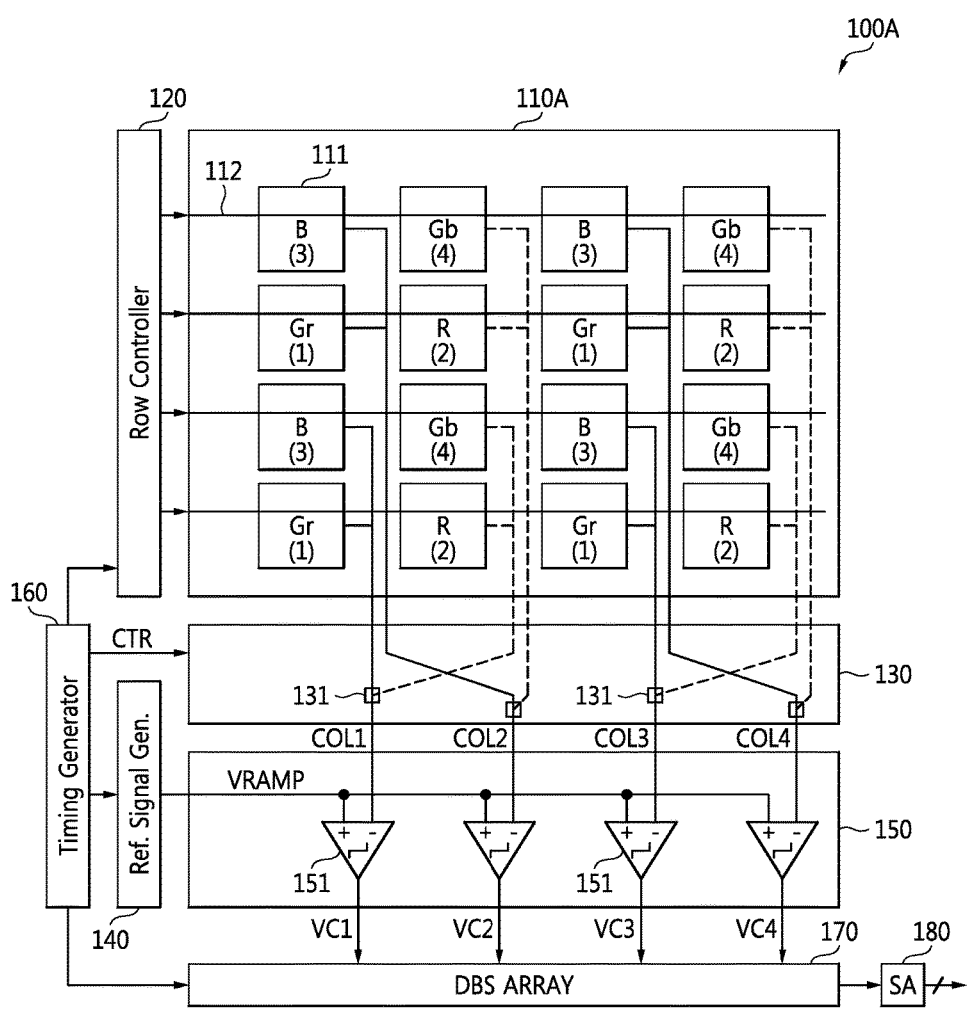
FIG. 1 is a block diagram of an image sensor according to an embodiment.

Embodiments will be described more fully hereinafter with reference to the accompanying drawings, in which particular embodiments are shown. Embodiments may, however, take many different forms and should not be construed as limited to the particular embodiments set forth herein. Rather, these embodiments are provided so that this disclosure will be thorough and complete, and will fully convey the scope to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or"

includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Color pixels having the same or similar characteristics as used herein may include the same or similar type of color pixels configured to output the same or similar type of color signals, or may be color pixels having the same or similar exposure time (for example, relatively long-exposure time or relatively short-exposure time). According to embodiments, the color pixels having the same or similar characteristics may include both the same or similar type of color pixels and the color pixels having the same or similar exposure time. An arrangement of the color pixels shown herein is shown for convenience of description, and the arrangement may be variously changed in other embodiments. For example, the pixels having similar characteristics are located across among the plurality of pixels.

FIG. 1 is a block diagram of an image sensor according to an embodiment. Referring to FIG. 1, an image sensor 100A may include a pixel array 110A, a row controller 120, a switch circuit 130, a reference signal generator 140, a comparison circuit 150, a timing generator 160, a data bus array 170, and a sense amplifier 180.

The image sensor 100A may be part of a front side illumination (FSI) image sensor or a back side illumination (BSI) image sensor according to whether a light receiving surface is a front side of a substrate or a back side of an associated substrate.

The pixel array 110A may include an active pixel sensor (APS) array. The pixel array 110A may include different types of color pixels. Here, color pixels Gr, R, B, and Gb will be used as examples. Each of the color pixels Gr, R, B, and Gb may be part of the APS. The color pixels Gr, R, B, and Gb may be disposed in a Bayer pattern, and the Bayer pattern may be repeatedly disposed in the pixel array 110A. According to an embodiment, the different types of color pixels may include a cyan color pixel, a yellow color pixel, a magenta color pixel, and/or a white color pixel.

R denotes a red color pixel which can generate a pixel signal (or charges) corresponding to a red color signal in response to wavelengths of a red region in a visible light region. Each of Gr and Gb denotes a green color pixel which can generate a pixel signal (or charges) corresponding to a green color signal in response to wavelengths of a green region in the visible light region. B denotes a blue color pixel which can generate a pixel signal (or charges) corresponding to a blue color signal in response to wavelengths of a blue region in the visible light region.

Green color pixels Gr and red color pixels R may be disposed in each odd numbered row. Blue color pixels B and green color pixels Gb may be disposed in each even numbered row. An architecture and an operation of the green color pixel Gr may be substantially the same as or similar to those of the green color pixel Gb. The green color pixel Gr and the green color pixel Gb may be disposed diagonally from each other in some embodiments.

As shown in FIG. 1, pixels having the same or similar characteristics, e.g., the same color pixels Gr, R, B, or Gb, are not disposed adjacent to each other; however, in other embodiments, pixels having the same or similar characteristics may be disposed adjacent to each other. Moreover, the same color pixels Gr, R, B, or Gb may be disposed in rows not adjacent to each other; however, in other embodiments, the same color pixels Gr, R, B, or Gb may be disposed in rows adjacent to each other. For example, pixels Gr and B included in a first pattern share a first column line and pixels R and Gb included in the first pattern share a second column line. A switch 131 may be configured to output a pixel signal output from the first column line or a pixel signal output from the second column line to a corresponding comparator 151 in response to a control signal CTR.

Control lines 112 for controlling an operation of each of the color pixels Gr, R, B, and Gb are disposed in each row. The row controller 120 may be configured to control an operation of each of the color pixels disposed in each row according to a control of the timing generator 160. The row controller 120 may include a row driver.

The switch circuit 130 may be configured to substantially simultaneously output the same type of color signals output only from the same type of color pixels Gr, R, B, or Gb among the color pixels Gr, R, B, and Gb included in a pixel array 110A in response to a control signal CTR. The switch circuit 130 may include multiple switches 131. Each of the switches 131 may include a selection circuit configured to operate in response to the control signal CTR or a multiplexer configured to operate in response to the control signal CTR. According to some embodiments, the control signal CTR may include one or more control signals.

Each switch 131 may be configured to output a pixel signal output from one of a first column line and a second column line to each comparator 151 in response to the control signal CTR.

The reference signal generator 140 may be configured to control timing of a reference signal VRAMP according to a control of the timing generator 160. In some embodiments, the reference signal generator 140 may include a ramp signal generator, and the ramp signal generator may be configured to generate a ramp signal VRAMP.

The comparison circuit 150 may be configured to compare each of the color signals having the same or similar characteristics (e.g., the same type of color signals) with the reference signal VRAMP, and output each of comparison signals VC1 to VC4 corresponding to a result of the comparison. The comparison circuit 150 may include multiple comparators 151, each comparator 151 may be configured to compare a corresponding one of the pixel signals COL1 to COL4 output from a corresponding switch 131 with the reference signal VRAMP, and output a corresponding one of the comparison signals VC1 to VC4 corresponding to a result of the comparison. The comparison circuit 150 may be configured to perform a function of an analog-to-digital conversion circuit. That is, the comparison circuit 150 may be configured to convert each of the pixel signals COL1 to COL4 into each digital signal in response to the reference signal VRAMP. Each comparator 151 may be configured to perform a function of an analog-to-digital converter.

The timing generator 160 may be configured to generate control signals to control an operation of the row controller 120, the switch circuit 130, the reference signal generator 140, and/or the data bus array 170 in response to external control signals.

The data bus array 170 may be configured to generate digital signals corresponding to the comparison signals VC1 to VC4. For example, the data bus array 170 may be configured to generate digital signals corresponding to each of the pixel signals COL1 to COL4 based on a clock signal and each of the comparison signals VC1 to VC4. According to an embodiment, the data bus array 170 may include multiple counters (not shown) and multiple memories (not shown). A first counter may be configured to generate first digital signals corresponding to a first pixel signal COL1 in response to a clock signal and a first comparison signal VC1, and a first memory may be configured to store the first digital signals. A memory may include latches or flip-flops, for example.

A second counter may be configured to generate second digital signals corresponding to a second pixel signal COL2 in response to a clock signal and a second comparison signal VC2, and a second memory may be configured to store the second digital signals. An operation of each of multiple counters may be substantially the same as or similar to an operation of the first counter. An operation of each of multiple memories may be substantially the same as or similar to an operation of the first memory.

A sense amplifier 180 may sense and amplify digital signals output from the data bus array 170. The sense amplifier 180 may include one or more sense amplifiers.

Figure 2:
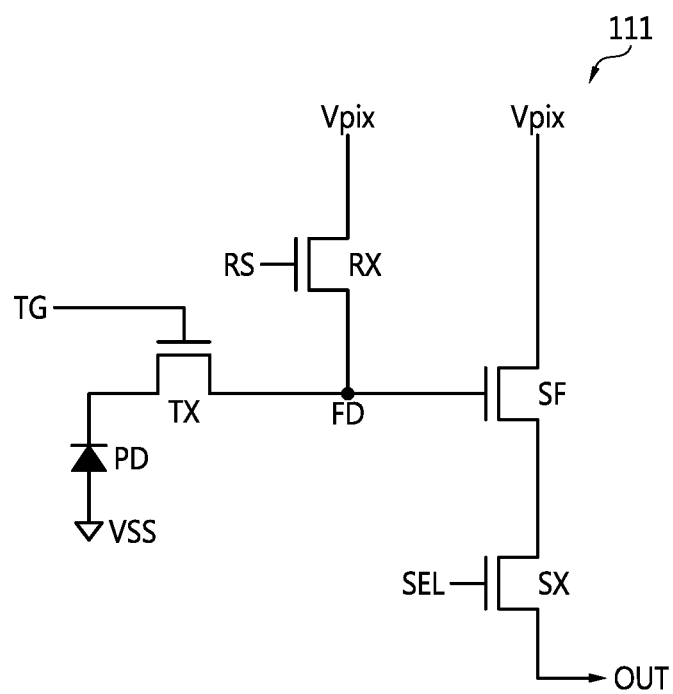
FIG. 2 is an embodiment of a circuit diagram of a color pixel shown in FIG. 1.

FIG. 2 is an embodiment of a circuit diagram of a color pixel shown in FIG. 1. Referring to FIGS. 1 and 2, the color pixels Gr, R, B, and Gb have an architecture and an operation substantially the same as or similar to each other. A color pixel 111 may be one of the color pixels Gr, R, B, and Gb.

The color pixel 111 may include one photoelectric conversion element PD and four transistors TX, RX, SF, and SX. According to some embodiments, the color pixel 111 may include one photoelectric conversion element PD and N transistors. At this time, N may be three or five; however, in other embodiments the number may be different.

The photoelectric conversion element PD may include a photodiode, a phototransistor, a photogate, a pinned photodiode, or the like. The photoelectric conversion element PD may be configured to generate charges (e.g., electrons and/or holes) in response to light incident through a filter. The filter may be a red color filter, a green color filter, or a blue color filter; however, it is not limited thereto.

A transmission transistor TX may be configured to transmit charges generated by the photoelectric conversion element PD to a floating diffusion region (FD) in response to a transmission control signal TG.

A reset transistor RX may be configured to reset the floating diffusion region FD in response to a reset signal RS. Vpix may be an operation voltage, and VSS may be a ground voltage. A source follower SF may be configured to perform a function of source following in response to a voltage corresponding to charges accumulated in the floating diffusion region FD. A selection transistor SX may be configured to output a signal output from the source follower SF to a corresponding column line as a pixel signal OUT in response to a selection signal SEL.

An activation timing or inactivation timing of each of control signals TG, RS, and SEL may be controlled by the row controller 120, which may be controlled by the timing generator 160. Activation denotes a transition from one of a low level and a high level to the other of the low level and the high level, and the inactivation may be opposite to the activation. The control signals TG, RS, and SEL may be transmitted to the color pixel 111 through control lines 112.

Figure 3:
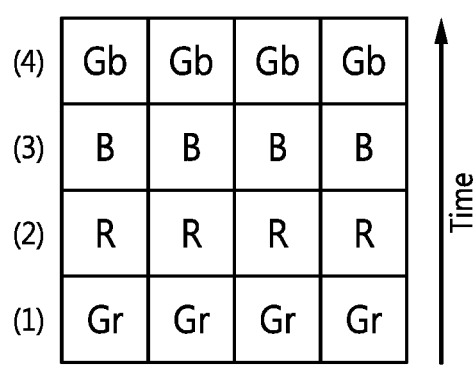
FIG. 3 conceptually shows a readout operation for color pixels having the same or similar characteristics among color pixels shown in FIG. 1.

FIG. 3 conceptually shows a readout operation for color pixels having the same or similar characteristics among color pixels shown in FIG. 1. Color pixels having the same or similar characteristics in FIGS. 1 and 3 may be the same or similar type of color pixels configured to output the same or similar type of color signals. Referring to FIGS. 1 to 3, the row controller 120 is configured to activate color pixels Gr and R included in odd numbered lines at a first time point 1.

The switches 131 included in the switch circuit 130 may be configured to substantially simultaneously output green pixel signals COL1 to COL4 output from the green color pixels Gr in response to a control signal CTR. Accordingly, the comparators 151 included in the comparison circuit 150 may be configured to start to compare the green pixel signals COL1 to COL4 with the reference signal VRAMP, and output the comparison signals VC1 to VC4. Accordingly, the image sensor 100A may reduce a coupling phenomenon between the comparators 151 which process pixel signals of different colors, thereby suppressing non-linearity of each of the comparators 151.

The row controller 120 activates color pixels Gr and R included in odd numbered lines at a second time point 2. According to an embodiment, activation of the color pixels Gr and R included in odd numbered lines may be maintained from the first time point 1 to the second time point 2.

The switches 131 included in the switch circuit 130 may be configured to substantially simultaneously output red pixel signals COL1 to COL4 output from the red color pixels R in response to a control signal CTR. Accordingly, the comparators 151 included in the comparison circuit 150 may be configured to start to simultaneously compare the red pixel signals COL1 to COL4 with the reference signal VRAMP, and output the comparison signals VC1 to VC4. Accordingly, the image sensor 100A may reduce a coupling phenomenon between the comparators 151 which process pixels signals of different colors, thereby suppressing non-linearity of each of the comparators 151.

The row controller 120 is configured to activate color pixels B and Gb included in even numbered lines at a third time point 3.

The switches 131 included in the switch circuit 130 may be configured to substantially simultaneously output blue pixel signals COL1 to COL4 output from the blue color pixels B in response to a control signal CTR. Accordingly, the comparators 151 included in the comparison circuit 150 may be configured to start to substantially simultaneously compare blue pixel signals COL1 to COL4 with the reference signal VRAMP, and output the comparison signals VC1 to VC4. Accordingly, the image sensor 100A may reduce a coupling phenomenon between the comparators 151 which process pixel signals of different colors, thereby suppressing non-linearity of each of the comparators 151.

The row controller 120 is configured to activate color pixels B and Gb included in even numbered lines at a fourth time point 4. Activation of the color pixels B and Gb included in even numbered lines may be maintained from the third time point 3 to the fourth time point 4.

The switches 131 included in the switch circuit 130 may be configured to substantially simultaneously output green pixel signals COL1 to COL4 output from the green color pixels Gb in response to a control signal CTR. Accordingly, the comparators 151 included in the comparison circuit 150 may be configured to start to substantially simultaneously compare the green pixel signals COL1 to COL4 with the reference signal VRAMP, and output the comparison signals VC1 to VC4. Accordingly, the image sensor 100A may reduce a coupling phenomenon between the comparators 151 which process pixel signals of different colors, thereby suppressing non-linearity of each of the comparators 151.

That is, the switch circuit 130 according to an embodiment may be configured to substantially simultaneously output color pixel signals output from color pixels having the same or similar characteristics (e.g., the same or similar color pixels) to the comparison circuit 150 at each time point, and the comparison circuit 150 may be configured to substantially simultaneously process each of the pixel signals COL1 to COL4. "Simultaneously" herein means not only completely at the same time, but also substantially at the same time acceptable in a design error range in a time manner.

Figure 4:
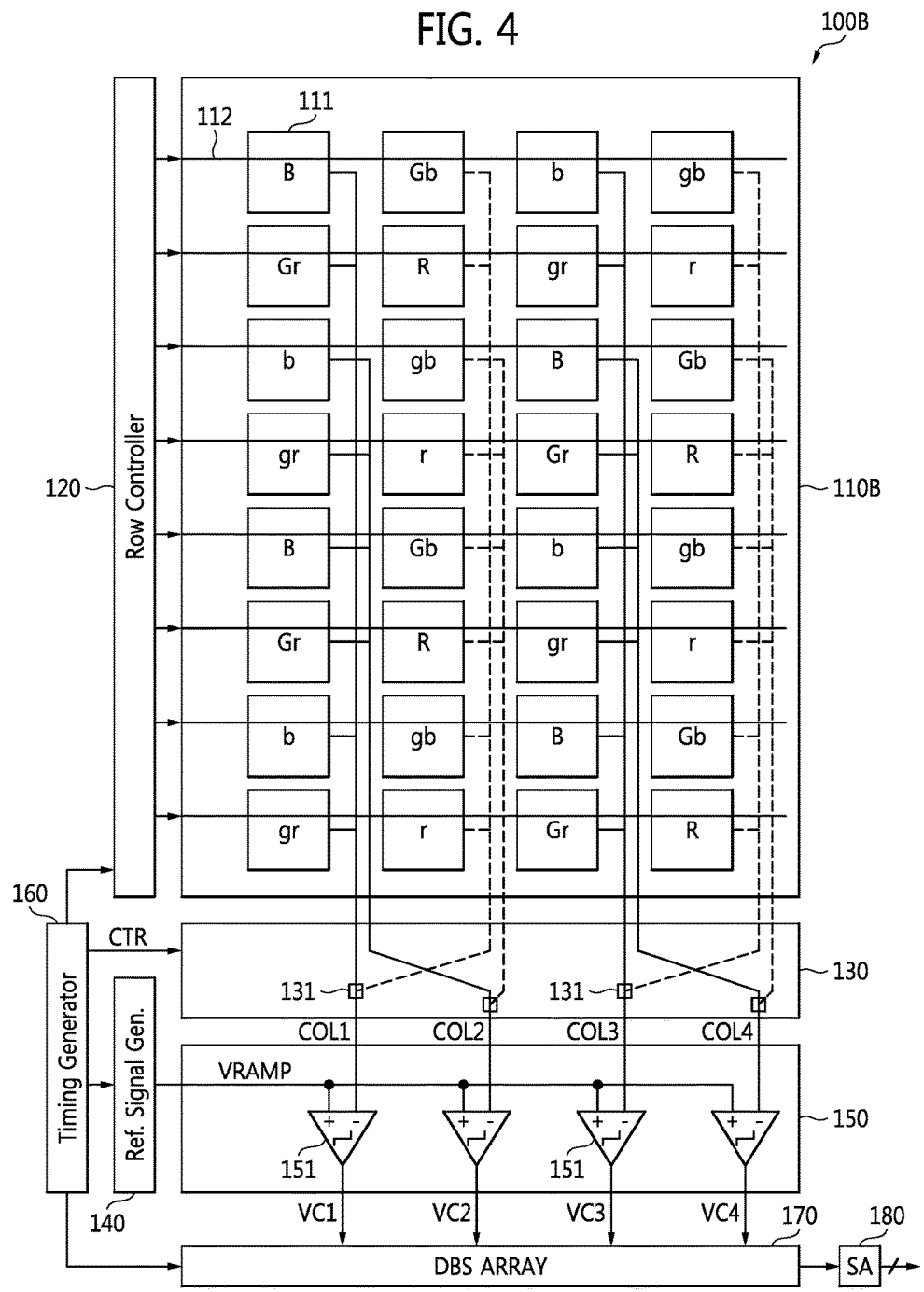
FIG. 4 is a block diagram of an image sensor according to another embodiment.

FIG. 4 is a block diagram of an image sensor according to another embodiment. Referring to FIG. 4, an image sensor 100B may include a pixel array 110B, the row controller 120, the switch circuit 130, the reference signal generator 140, the comparison circuit 150, the timing generator 160, the data bus array 170, and the sense amplifier 180. The image sensor 100B may be embodied in a FSI image sensor, a BSI image sensor, or the like.

The pixel array 110B may be an APS array. The pixel array 110B may include different types of color pixels Gr, R, B, Gb, gr, r, b, and gb. Each of the color pixels Gr, R, B, Gb, gr, r, b, and gb may be the APS. At this time, the image sensor 100B may be configured to operate in a wide dynamic range (WDR) mode.

R and r denote a red color pixel configured to generate a pixel signal (or charges) corresponding to a red color signal in response to wavelengths of a red region in the visible light region. Each of Gr, gr, Gb, and gb denotes a green color pixel configured to generate a pixel signal (or charges) corresponding to a green color signal in response to wavelengths of a green region in the visible light region. B and b denote a blue color pixel configured to generate a pixel signal (or charges) corresponding to a blue color signal in response to wavelengths of a blue region in the visible light region.

Each of the pixels Gr, R, B, and Gb denotes a pixel controlled with a relatively long-exposure time, and each of the pixels gr, r, b, and gb denotes a pixel controlled with a relatively short-exposure time. For example, the pixels Gr, R, B, and Gb may have substantially the same exposure time, and the pixels gr, r, b, and gb may have substantially the same exposure time.

An exposure time for each of the pixels Gr, R, B, Gb, gr, r, b, and gb may be controlled by the row controller 120 which is configured to be controlled by the timing generator 160. The exposure time may denote an integration time of the photoelectric conversion element PD included in each color pixel 111. The exposure time or the integration time may be controlled by an activation timing and/or inactivation timing of a transmission control signal TG input to a transmission gate TG included in each color pixel 111.

FIG. 5 conceptually shows a readout operation for color pixels having the same or similar characteristics among the color pixels shown in FIG. 4. In FIGS. 4 and 5, the color pixels having the same or similar characteristics may be the same or similar color pixels, and may denote color pixels having substantially the same exposure time (for example, relatively long-exposure time or relatively short-exposure time). Referring to FIGS. 1, 2, 4, and 5, the row controller 120 is configured to activate the color pixels gr, r, Gr, and R included in odd numbered lines at a first time point 1.

Activation of a color pixel herein may denote a state in which the color pixel outputs can output a pixel signal in response to control signals output from the row controller 120.

The switches 131 included in the switch circuit 130 may be configured to substantially simultaneously output green pixel signals COL1 to COL4 output from the green color pixels gr, each having a short-exposure time in response to a control signal CTR. Accordingly, the comparators 151 included in the comparison circuit 150 may be configured to start to substantially simultaneously compare the green pixel signals COL1 to COL4 with the reference signal VRAMP, and output the comparison signals VC1 to VC4. Accordingly, the image sensor 100B may reduce a coupling phenomenon between the comparators 151 which process pixel signals of different colors, thereby suppressing non-linearity of each of the comparators 151.

The row controller 120 may be configured to activate color pixels gr, r, Gr, and R included in odd numbered lines at a second time point 2. According to an embodiment, activation of the color pixels gr, r, Gr, and R included in odd numbered lines may be maintained from the first time point 1 to the second time point 2.

The switches 131 included in the switch circuit 130 may be configured to substantially simultaneously output red pixel signals COL1 to COL4 output from the red color pixels r each having a short-exposure time in response to a control signal CTR. Accordingly, the comparators 151 included in the comparison circuit 150 may be configured to start to substantially simultaneously compare the red pixel signals COL1 to COL4 with the reference signal VRAMP, and output the comparison signals VC1 to VC4. Accordingly, the image sensor 100B may reduce a coupling phenomenon between the comparators 151 which process pixel signals of different colors, thereby suppressing non-linearity of each of the comparators 151. The row controller 120 may be configured to activate color pixels b, gb, B, and Gb included in even numbered lines at the third time point 3.

The switches 131 included in the switch circuit 130 may be configured to substantially simultaneously output blue pixel signals COL1 to COL4 output from the blue color pixels b each having a short-exposure time in response to a control signal CTR. Accordingly, the comparators 151 included in the comparison circuit 150 may be configured to start to substantially simultaneously compare the blue pixel signals COL1 to COL4 with the reference signal VRAMP, and output the comparison signals VC1 to VC4. Accordingly, the image sensor 100B may reduce a coupling phenomenon between the comparators 151 which process pixel signals of different colors, thereby suppressing non-linearity of each of the comparators 151.

The row controller 120 may be configured to activate color pixels b, gb, B, and Gb included in even numbered lines at the fourth time point 4. According to an embodiment, activation of the color pixels b, gb, B, and Gb included in even numbered lines may be maintained from the third time point 3 to the fourth time point 4.

The switches 131 included in the switch circuit 130 may be configured to substantially simultaneously output green pixel signals COL1 to COL4 output from the green color pixels gb each having a short-exposure time in response to a control signal CTR. Accordingly, the comparators 151 included in the comparison circuit 150 may be configured to start to substantially simultaneously compare the green pixel signals COL1 to COL4 with the reference signal VRAMP, and output the comparison signals VC1 to VC4. Accordingly, the image sensor 100B may reduce a coupling phenomenon between the comparators 151 which process pixel signals of different colors, thereby suppressing non-linearity of each of the comparators 151. The row controller 120 may be configured to activate color pixels gr, r, Gr, and R included in odd numbered lines at a fifth time point 5.

The switches 131 included in the switch circuit 130 may be configured to substantially simultaneously output green pixel signals COL1 to COL4 output from the green color pixels Gr each having a long-exposure time in response to a control signal CTR. Accordingly, the comparators 151 included in the comparison circuit 150 may be configured to start to substantially simultaneously compare the green pixel signals COL1 to COL4 with the reference signal VRAMP, and output the comparison signals VC1 to VC4. Accordingly, the image sensor 100B may reduce a coupling phenomenon between the comparators 151 which process pixel signals of different colors, thereby suppressing non-linearity of each of the comparators 151.

The row controller 120 may be configured to activate the color pixels gr, r, Gr, and R included in odd numbered lines at a sixth time point 6. According to an embodiment, activation of the color pixels gr, r, Gr, and R included in odd numbered lines may be maintained from the fifth time point 5 to the sixth time point 6.

The switches 131 included in the switch circuit 130 may be configured to substantially simultaneously output red pixel signals COL1 to COL4 output from the red color pixels R each having a long-exposure time in response to a control signal CTR. Accordingly, the comparators 151 included in the comparison circuit 150 may be configured to start to substantially simultaneously compare the red pixel signals COL1 to COL4 with the reference signal VRAMP, and output the comparison signals VC1 to VC4. Accordingly, the image sensor 100B may reduce a coupling phenomenon between the comparators 151 which process pixel signals of different colors, thereby suppressing non-linearity of each of the comparators 151. The row controller 120 may be configured to activate color pixels b, gb, B, and Gb included in even numbered lines at a seventh time point 7.

The switches 131 included in the switch circuit 130 may be configured to substantially simultaneously output blue pixel signals COL1 to COL4 output from the blue color pixels B each having a long-exposure time in response to a control signal CTR. Accordingly, the comparators 151 included in the comparison circuit 150 may be configured to start to substantially simultaneously compare the blue pixel signals COL1 to COL4 with the reference signal VRAMP, and output the comparison signals VC1 to VC4. Accordingly, the image sensor 100B may reduce a coupling phenomenon between the comparators 151 which process pixel signals of different colors, thereby suppressing non-linearity of each of the comparators 151.

The row controller 120 may be configured to activate the color pixels b, gb, B, and Gb included in even numbered lines at an eighth time point 8. According to an embodiment, activation of the color pixels b, gb, B, and Gb included in even numbered lines may be maintained from the seventh time point 7 to the eighth time point 8.

The switches 131 included in the switch circuit 130 may be configured to substantially simultaneously output green pixel signals COL1 to COL4 output from the green color pixels Gb each having a long-exposure time in response to a control signal CTR. Accordingly, the comparators 151 included in the comparison circuit 150 may be configured to start to substantially simultaneously compare the green pixel signals COL1 to COL4 with the reference signal VRAMP, and output the comparison signals VC1 to VC4. Accordingly, the image sensor 100B may reduce a coupling phenomenon between the comparators 151 which process pixel signals of different colors, thereby suppressing non-linearity of each of the comparators 151.

That is, the switch circuit 130 according to an embodiment may substantially simultaneously output color pixel signals output from pixels having the same or similar characteristics (e.g., color pixels having the same exposure time) at each time point to the comparison circuit 150, and the comparison circuit 150 may substantially simultaneously process each of the pixel signals COL1 to COL4.

As shown in FIG. 5, pixel signals output from color pixels corresponding to a long-exposure time and pixel signals output from color pixels corresponding to a short-exposure time are not substantially simultaneously analog-to-digital converted at a specific time point.

Although different pixel types, such as different color pixels and pixels with different exposure times have been used as examples, the different types of pixels are not limited to color and/or exposure time differences. Any difference between pixel types that may result in difference between output signals from adjacent pixels that is greater than a difference between output signals from similarly situated pixels of the same type may be used as a difference to define different types of pixels. In other words, pixel types may be organized such that when pixels of a single pixel type are output substantially simultaneously, a signal difference between adjacent signals in the comparison circuit 150 is reduced or minimized.

Furthermore, although a particular connection between pixels and switches 131 has been used as an example, the connections may be any such that groups of pixels of the same type may be output from the switch circuit 130 regardless of their row, column, or other position.

Figure 6:
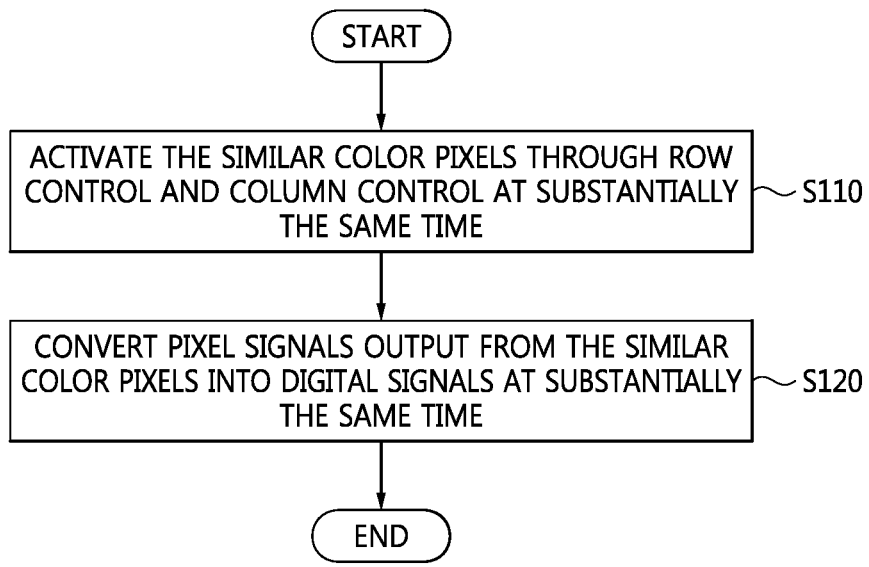
FIG. 6 is a flowchart that describes an operation of the image sensor shown in FIG. 1.

FIG. 6 is a flowchart that describes an operation of the image sensor shown in FIG. 1. Referring to FIGS. 1 to 3, and 6, similar color pixels (Gr, R, B, or Gb) among multiple pixels Gr, R, B, and Gb are substantially simultaneously activated (or selected) by a row control of the row controller 120 and a column control of the switch circuit 130, and the switch circuit 130 may substantially simultaneously output pixel signals COL1 to COL4 output from the same color pixels Gr, R, B, or Gb to the comparison circuit 150 (S110).

The comparison circuit 150 may convert the pixel signals COL1 to COL4 output from similar color pixels Gr, R, B, or Gb into analog-to-digital signals (S120).

Figure 7:
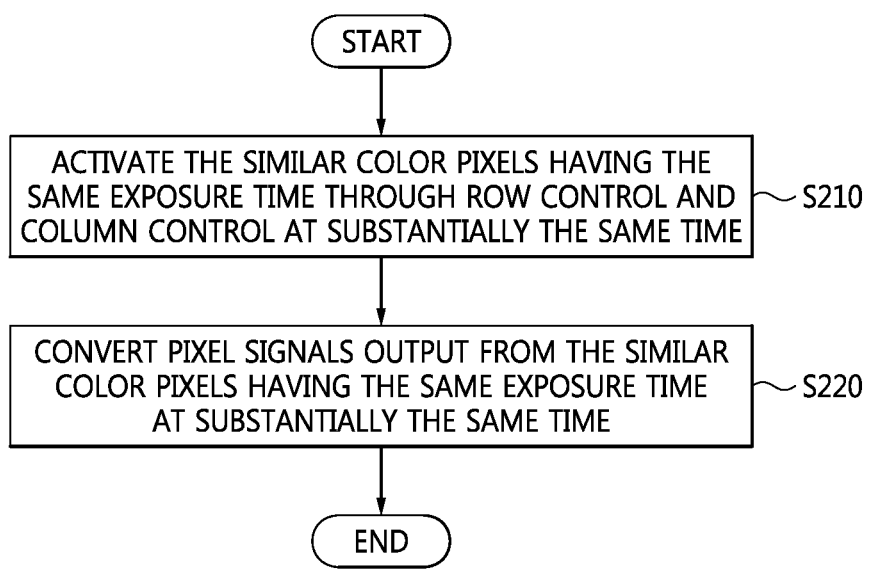
FIG. 7 is a flowchart that describes an operation of the image sensor shown in FIG. 4.

FIG. 7 is a flowchart that describes an operation of the image sensor shown in FIG. 4. Referring to FIGS. 2, 4, 5, and 7, similar color pixels Gr, R, B, Gb, gr, r, b, or gb that have a similar exposure time (e.g., one of a long-exposure time and a short-exposure time) among multiple pixels Gr, R, B, Gb, gr, r, b, and gb are substantially simultaneously activated (or selected) by a row control of the row controller 120 and a column control of the switch circuit 130, and the switch circuit 130 may substantially simultaneously output the pixel signals COL1 to COL4 output from similar color pixels Gr, R, B, Gb, gr, r, b, or gb to the comparison circuit 150 (S210).

The comparison circuit 150 may substantially simultaneously convert the pixel signals COL1 to COL4 output from similar color pixels Gr, R, B, Gb, gr, r, b, or gb which have a similar exposure time into analog-to-digital signals (S220).

Figure 8:
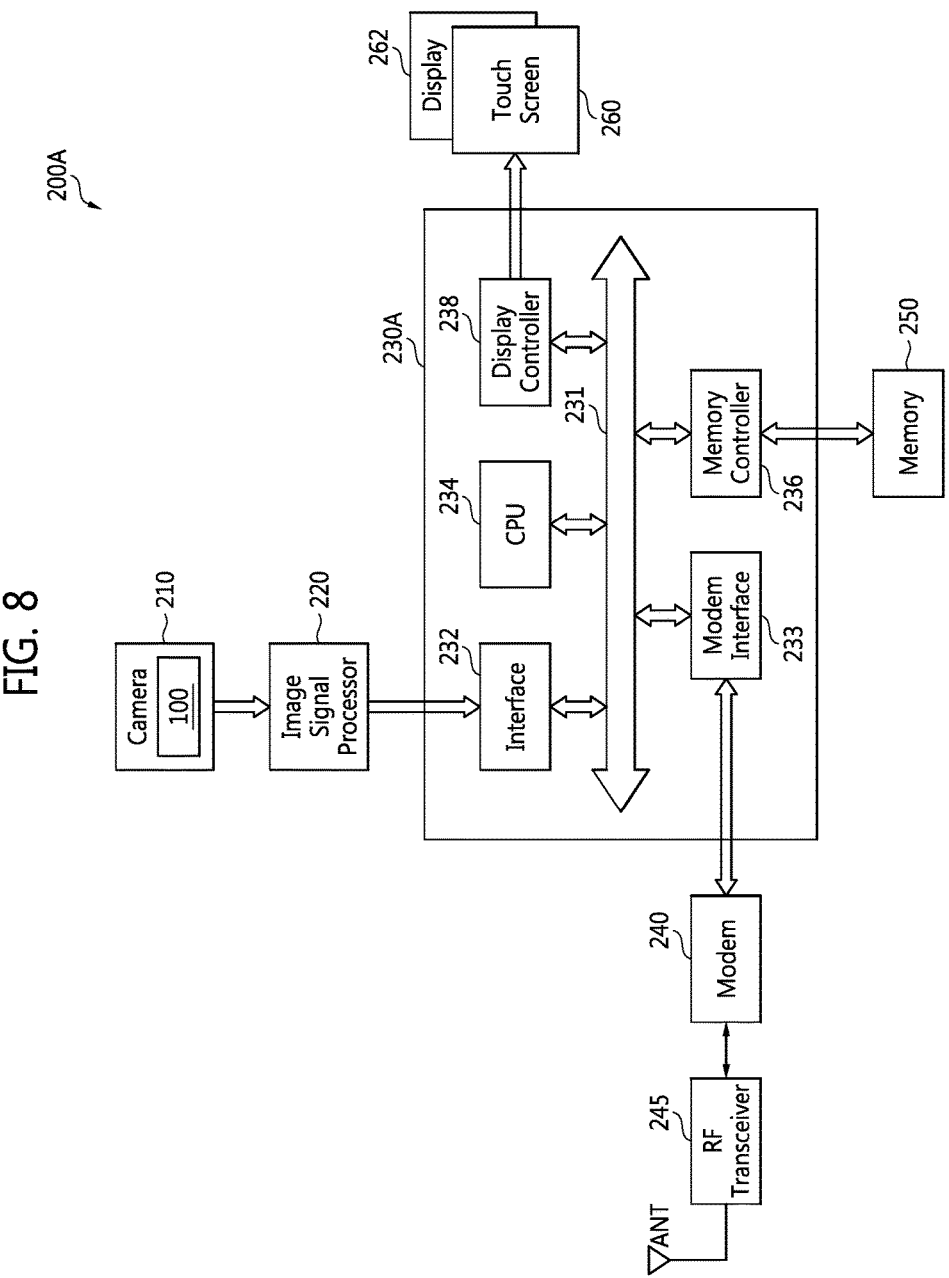
FIG. 8 is a block diagram of an embodiment of a computing device including the image sensor shown in FIG. 1 or 4.

FIG. 8 is a block diagram of an embodiment of a computing device including the image sensor shown in FIG. 1 or 4. Referring to FIGS. 1 to 8, a computing device 200A may be a mobile computing device. The mobile computing device may include a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, an e-book, or the like.

The computing device 200A may include a camera 210 having an image sensor 100, an image signal processor 220, a controller 230A, a modem 240, a radio transceiver 245, a memory 250, and a display 262 having a touch screen 260. The image sensor 100 may be the image sensor 100A or 100B described referring to FIGS. 1 to 7 or another image sensor according to an embodiment.

The camera 210 may be configured to generate image data using the image sensor 100. The image signal processor 220 may be configured to process the image data and output the processed image data to a controller 230A. The image signal processor 220 may be configured to change image data having a first format into image data having a second format. For example, the first format may be a Bayer pattern, and the second format may be a YUV format or an RGB format; however, other embodiments are not limited thereto.

In order to perform a WDR operation on a dark region of an image, the image signal processor 220 may be configured to calculate a color signal for the color pixel gb having a short-exposure time using (e.g., interpolating) color signals output from the color pixels Gb which are disposed adjacent to the color pixel gb and have a long-exposure time.

Moreover, in order to perform the WDR operation on a bright region of an image, the image signal processor 220 may be configured to calculate a color signal for the color pixel Gb having a long-exposure time using (e.g., interpolating) color signals output from the color pixels gb which are disposed adjacent to the color pixel Gb and have a short-exposure time.

The radio transceiver 245 may be configured to transmit radio data received through an antenna ANT to the modem 240. Moreover, the radio transceiver 245 may be configured to convert data output from the modem 240 into radio data, and transmit the radio data to the outside through the antenna ANT. The modem 240 may be configured to process data transmitted or received between the radio transceiver 245 and the controller 230A.

The controller 230A may be configured to control the camera 210, the image signal processor 220, the modem 240, the radio transceiver 245, the memory 250, the touch screen 260, and/or the display 262. The controller 230A may be embodied in an integrated circuit, a system on chip (SoC), an application processor (AP), or a mobile AP. The controller 230A may include a bus architecture 231, an interface 232, a modem interface 233, a CPU 234, a memory controller 236, and a display controller 238.

The CPU 234 may be configured to control the interface 232, the modem interface 233, the memory controller 236, and the display controller 238 through the bus architecture 231.

The bus architecture 231 may be embodied in an Advanced Microcontroller Bus Architecture (AMBA), an Advanced High-performance Bus (AHB), an Advanced Peripheral Bus (APB), an Advanced eXtensible Interface (AXI) or an Advanced System Bus (ASB); however, other embodiments are not limited thereto.

The interface 232 may be configured to transmit image data received from the ISP 220 to the bus architecture 231. The modem interface 233 may be configured to control processing and/or transmission of data transmitted or received to or from the modem 240 according to a control of the CPU 234.

The memory controller 236 may be configured to control an access operation on the memory 250 according to a control of the CPU 234. The access operation may include a write operation of writing data in the memory 250 and a read operation of reading data from the memory 250.

The memory 250 may include a volatile memory or a non-volatile memory. For convenience of description, one memory controller 236 and one memory 250 are shown in FIG. 8; however, the memory controller 236 may collectively denote memory controllers which can control different types of memory devices. According to embodiments, the memory 250 may include a DRAM.

According to embodiments, the memory 250 may include a flash-based memory. The flash-based memory may be embodied in a NAND type flash memory, a NOR type flash memory, a multimedia card (MMC), an embedded MMC (eMMCTM), or a universal flash storage (UFS); however, other embodiments are not limited thereto.

The display controller 238 may be configured to transmit data to be displayed on the display 262 to the display 262 according to a control of the CPU 234. According to an embodiment, the display controller 238 and the display 262 may be configured to transmit or receive data through an MIPI display serial interface. According to another embodiment, the display controller 238 and the display 262 may be configured to transmit or receive data through an embedded DisplayPort (eDP).

The touch screen 260 may be configured to transmit a user input which can control an operation of the computing device 200A to the controller 230A. The user input may be generated when a user touches the touch screen 260. The CPU 234 may be configured to control an operation of the camera 210, the controller 230A, the memory 250, and/or the display 262 according to the user input transmitted from the touch screen 260.

Figure 9:
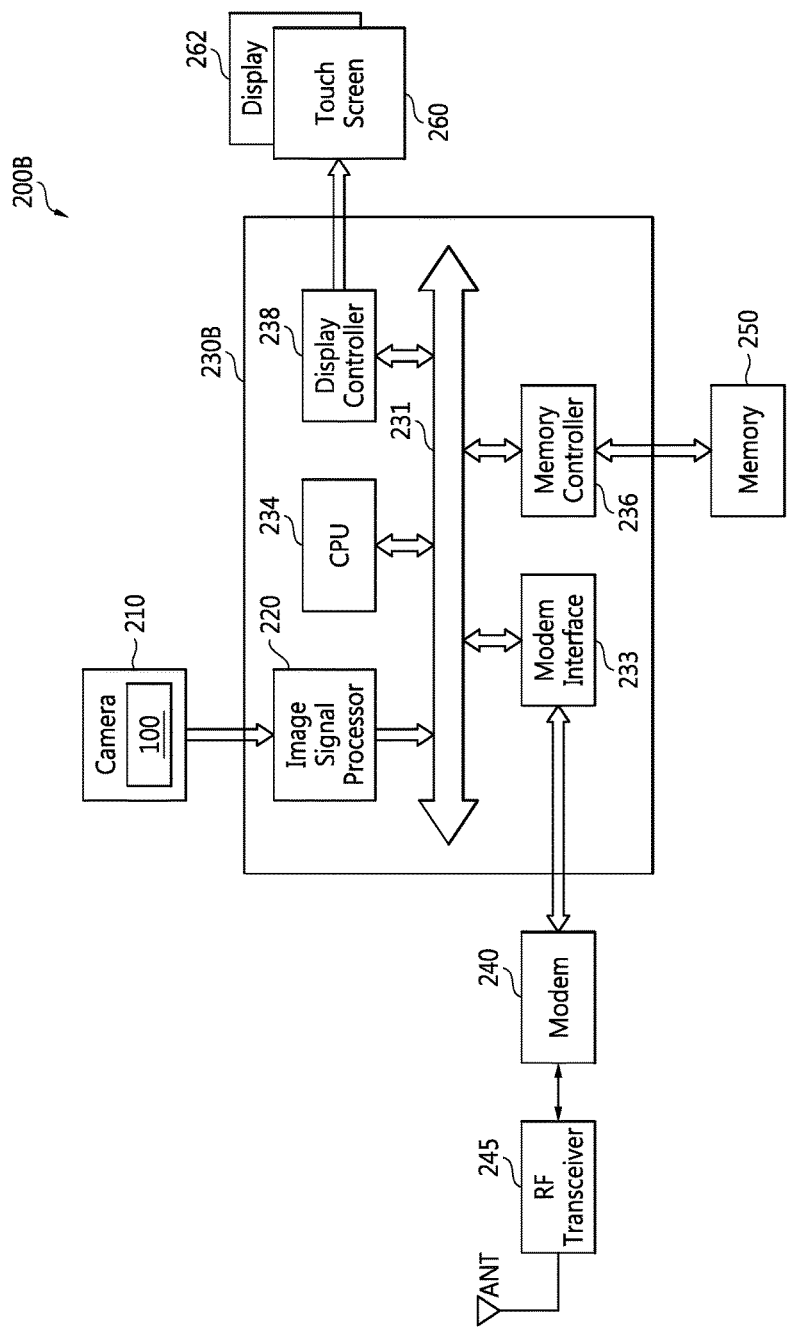
FIG. 9 is a block diagram of another embodiment of the computing device including the image sensor shown in FIG. 1 or 4.

FIG. 9 is a block diagram of another embodiment of the computing device including the image sensor shown in FIG. 1 or 4. Referring to FIGS. 8 and 9, except for the ISP 220 and the interface 232, an architecture and an operation of the computing device 200A including the controller 230A of FIG. 8 are substantially the same as or similar to an architecture and an operation of the computing device 200B having the controller 230B of FIG. 9.

The ISP 220 may be included in the controller 230B in FIG. 9. The ISP 220 may be configured to receive and process image data output from the image sensor 100, and transmit processed image data to the bus architecture 231. The image sensor 100 and the controller 230B may be configured to transmit or receive data to or from each other through an MIPI camera serial interface (CSI).

An image sensor according to an embodiment may substantially simultaneously analog-to-digital convert pixel signals output from color pixels having the same or similar characteristics among multiple pixels through a row control and a column control. An image sensor according to an embodiment may reduce a coupling phenomenon between comparators which process pixel signals of different colors, thereby suppressing non-linearity of each of the comparators.

An embodiment includes an image sensor, including color pixels, a switch circuit configured to substantially simultaneously output color signals output only from color pixels having the same or similar characteristics among the color pixels in response to a control signal, and a comparison circuit which compares each of the color signals with a reference signal and outputs each of comparison signals corresponding to a result of the comparison. According to an embodiment, color pixels having the same or similar characteristics may be the same type of color pixels configured to output the same type of color signals. According to another embodiment, the color pixels having the same or similar characteristics may be color pixels having the same exposure time. The color pixels having the same or similar characteristics may be disposed in rows not adjacent to each other.

The color pixels may include first color pixels and second color pixels disposed in each odd numbered row, and third color pixels and fourth color pixels disposed in each even numbered row, and the switch circuit may be configured to simultaneously output the color signals output from the first color pixels, the second color pixels, the third color pixels, or the fourth color pixels to the comparison circuit in response to the control signal. Each of the first color pixels and each of the fourth color pixels may be diagonally disposed.

Each of the second color pixels is a red color pixel, each of the third color pixels is a blue color pixel, and each of the first color pixels and each of the fourth color pixels are green color pixels. One of the first color pixels and one of the third color pixels share a first column line, and one of the second color pixels and one of the fourth color pixels share a second column line.

The switch circuit may include a switch configured to output one of an output signal of the first column line and an output signal of the second column line in response to the control signal.

An embodiment includes a mobile computing device, including an image sensor and an application processor which controls an operation of the image sensor. The image sensor may include color pixels, a switch circuit configured to simultaneously output color signals output only from color pixels having the same or similar characteristics among the color pixels in response to the control signal, and a comparison circuit configured to compare each of the color signals with a reference signal and output each of comparison signals corresponding to results of the comparison.

According to an embodiment, color pixels having the same or similar characteristics may be the same type of color pixels which output the same type of color signals. According to another embodiment, color pixels having the same or similar characteristics may be color pixels having the same exposure time. The color pixels having the same or similar characteristics are not adjacent to each other.

Although particular embodiments have been shown and described, it will be appreciated by those skilled in the art that changes may be made in these embodiments without departing from the principles and spirit and scope, which is defined in the appended claims and their equivalents.

What is claimed is:

1. An image sensor having a plurality of pixels disposed in a rows and columns, the image sensor comprising:
a first Bayer pattern of pixels and a second Bayer pattern of pixels adjacent to the first Bayer pattern of pixels in a column direction, each of the first and second Bayer patterns of pixels including a first pixel having a first color arranged in a first column and a second pixel having a second color arranged in a second column;
a first column line connected to the first pixel in the first Bayer pattern;
a second column line connected to the second pixel in the first Bayer pattern;
a third column line connected to the first pixel in the second Bayer pattern;
a fourth column line connected to the second pixel in the second Bayer pattern;
a first switch to output one of the first column line and the second column line;
a second switch to output one of the third column line and the fourth column line;
a first analog-to-digital converter (ADC) connected to an output of the first switch; and
a second ADC connected to an output of the second switch, the second ADC being adjacent to the first ADC,
wherein the first switch and the second switch output the first pixel in the first Bayer pattern and the first pixel in the second Bayer pattern substantially simultaneously.

2. The image sensor in claim 1, wherein the first pixel in the first Bayer pattern of pixels and the first pixel in the second Bayer pattern of pixels have the same exposure time.

3. The image sensor in claim 1, wherein the first pixel in the first Bayer pattern of pixels and the first pixel in the second Bayer pattern of pixels have different exposure times.

4. The image sensor in claim 1, wherein the pixels are color pixels.

5. The image sensor of claim 4, wherein the pixels include at least one red pixel, at least one blue pixel, at least one first green pixel, and at least one second green pixel.

6. The image sensor in claim 4, wherein the first pixel is a blue pixel and the second pixel is a green pixel.

7. The image sensor in claim 4, wherein the first pixel is a green pixel and the second pixel is a red pixel.

8. The image sensor in claim 1, further comprising:
a third Bayer pattern of pixels adjacent to the first Bayer pattern of pixels in a row direction and a fourth Bayer pattern of pixels adjacent to the third Bayer pattern of pixels in the column direction, each of the third and fourth Bayer patterns including a third pixel having a third color arranged in a third column and a second pixel having a second color arranged in a second column;
a fifth column line connected to the first pixel in the third Bayer pattern;
a sixth column line connected to the second pixel in the third Bayer pattern;
a seventh column line connected to the first pixel in the fourth Bayer pattern;
an eighth column line connected to the second pixel in the fourth Bayer pattern;
a third switch to output one of the fifth column line and the sixth column line;

a fourth switch to output one of the seventh column line and the eighth column line;
a third ADC connected to the output of the third switch, the third ADC being adjacent to the second ADC; and
a fourth ADC connected to the output of the second switch, the fourth ADC being adjacent to the third ADC,
wherein the third switch and the fourth switch output the first pixel in the third Bayer pattern and the first pixel in the fourth Bayer pattern substantially simultaneously.

9. An image sensor having a plurality of pixels disposed in a rows and columns, the image sensor comprising:
a first Bayer pattern of pixels and a second Bayer pattern of pixels adjacent to the first Bayer pattern of pixels in a column direction, each of the first and second Bayer patterns including a first pixel having a first color arranged in a first column and a second pixel having a second color arranged in a second column;
a first column line connected to the first pixel in the first Bayer pattern;
a second column line connected to the second pixel in the first Bayer pattern;
a third column line connected to the first pixel in the second Bayer pattern;
a fourth column line connected to the second pixel in the second Bayer pattern;
a first switch to output one of the first column line and the second column line;
a second switch to output one of the third column line and the fourth column line;
a first analog-to-digital converter (ADC) connected to an output of the first switch; and
a second ADC connected to an output of the second switch, the second ADC being adjacent to the first ADC,
wherein the first pixel in the first Bayer pattern of pixels and the first pixel in the second Bayer pattern of pixels have the same exposure time.

10. The image sensor in claim 9, wherein the first switch and the second switch output the first pixel in the first Bayer pattern of pixels and the first pixel in the second Bayer pixels pattern substantially simultaneously.

11. The image sensor in claim 10, further comprising:
a third Bayer pattern of pixels adjacent to the first Bayer pattern of pixels in a row direction and a fourth Bayer pattern of pixels adjacent to the third Bayer pattern of pixels in the column direction, each of the third and fourth Bayer patterns including a third pixel having a third color arranged in a third column and a second pixel having a second color arranged in a second column;
a fifth column line connected to the first pixel in the third Bayer pattern;
a sixth column line connected to the second pixel in the third Bayer pattern;
a seventh column line connected to the first pixel in the fourth Bayer pattern;
an eighth column line connected to the second pixel in the fourth Bayer pattern;
a third switch to output one of the fifth column line and the sixth column line;
a fourth switch to output one of the seventh column line and the eighth column line;
a third ADC connected to the output of the third switch, the third ADC being adjacent to the second ADC; and
a fourth ADC connected to the output of the second switch, the fourth ADC being adjacent to the third ADC,
wherein the third switch and the fourth switch output the first pixel in the third Bayer pattern and the first pixel in the fourth Bayer pattern substantially simultaneously.

12. The image sensor in claim 9, wherein the pixels are color pixels.

13. The image sensor in claim 12, wherein the first pixel is a blue pixel and the second pixel is a green pixel.

14. The image sensor in claim 12, wherein the first pixel is a green pixel and the second pixel is a red pixel.

15. An image sensor having a plurality of pixels disposed in a rows and columns, the image sensor comprising:
a first Bayer pattern of pixels and a second Bayer pattern of pixels adjacent to the first Bayer pattern of pixels in a column direction, each of the first and second Bayer patterns including a first pixel having a first color arranged in a first column and a second pixel having a second color arranged in a second column;
a first column line connected to the first pixel in the first Bayer pattern;
a second column line connected to the second pixel in the first Bayer pattern;
a third column line connected to the first pixel in the second Bayer pattern;
a fourth column line connected to the second pixel in the second Bayer pattern;
a first switch to output one of the first column line and the second column line;
a second switch to output one of the third column line and the fourth column line;
a first analog-to-digital converter (ADC) connected to an output of the first switch;
a second ADC connected to an output of the second switch, the second ADC being adjacent to the first ADC;
a data bus array to generate a first digital signal corresponding to an output of the first ADC and a second digital signal corresponding to an output of the second ADC; and
a sense amplifier to sense the first digital signal and the second digital signal and output the sensed first digital signal and the sensed second digital signal,
wherein the first switch and the second switch output the first pixel in the first Bayer pattern and the first pixel in the second Bayer pattern substantially simultaneously.

16. The image sensor in claim 15, wherein the first pixel in the first Bayer pattern of pixels and the first pixel in the second Bayer pattern of pixels have the same exposure time.

17. The image sensor in claim 15, wherein the first pixel in the first Bayer pattern of pixels and the first pixel in the second Bayer pattern of pixels have different exposure times.

18. The image sensor in claim 15, further comprising:
a third Bayer pattern adjacent to the first Bayer pattern in a row direction and a fourth Bayer pattern adjacent to the third Bayer pattern in the column direction, each of the third and fourth Bayer pattern including a third pixel having a third color arranged in a third column and a second pixel having a second color arranged in a second column;
a fifth column line connected to the first pixel in the third Bayer pattern;
a sixth column line connected to the second pixel in the third Bayer pattern;

a seventh column line connected to the first pixel in the fourth Bayer pattern;

an eighth column line connected to the second pixel in the fourth Bayer pattern;

a third switch to output one of the fifth column line and the sixth column line;

a fourth switch to output one of the seventh column line and the eighth column line;

a third ADC connected to the output of the third switch, the third ADC being adjacent to the second ADC; and a fourth ADC connected to the output of the second switch, the fourth ADC being adjacent to the third ADC, wherein the third switch and the fourth switch output the first pixel in the third Bayer pattern and the first pixel in the fourth Bayer pattern substantially simultaneously.

19. The image sensor in claim 15, wherein the first pixel is a blue pixel and the second pixel is a green pixel.

20. The image sensor in claim 15, wherein the first pixel is a green pixel and the second pixel is a red pixel.

\* \* \* \* \*